United States Patent
Guo et al.

(10) Patent No.: US 12,052,344 B2
(45) Date of Patent: Jul. 30, 2024

(54) METHOD AND APPARATUS FOR ELECTING REPRESENTATIVE NODE DEVICE, COMPUTER DEVICE, AND STORAGE MEDIUM

(71) Applicant: Tencent Technology (Shenzhen) Company Limited, Shenzhen (CN)

(72) Inventors: Rui Guo, Shenzhen (CN); Maocai Li, Shenzhen (CN); Zongyou Wang, Shenzhen (CN); Haitao Tu, Shenzhen (CN); Li Kong, Shenzhen (CN); Kaiban Zhou, Shenzhen (CN); Changqing Yang, Shenzhen (CN); Nan Wang, Shenzhen (CN); Yong Ding, Shenzhen (CN); Yifang Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 722 days.

(21) Appl. No.: 17/061,375

(22) Filed: Oct. 1, 2020

(65) Prior Publication Data
US 2021/0021412 A1    Jan. 21, 2021

Related U.S. Application Data

(63) Continuation of application No. PCT/CN2019/104057, filed on Sep. 2, 2019.

(30) Foreign Application Priority Data

Sep. 7, 2018 (CN) ................... 201811046269.8

(51) Int. Cl.
*H04L 9/08* (2006.01)
*H04L 61/2503* (2022.01)
*H04L 9/00* (2022.01)

(52) U.S. Cl.
CPC ........ *H04L 9/0825* (2013.01); *H04L 61/2503* (2013.01); *H04L 9/50* (2022.05); *H04L 2209/463* (2013.01)

(58) Field of Classification Search
CPC ..... H04L 9/0825; H04L 61/2503; H04L 9/50; H04L 2209/463; H04L 9/3239;
(Continued)

(56) References Cited

U.S. PATENT DOCUMENTS 7,532,585 B2 * 5/2009 Kim .................. H04L 45/00
  370/254
9,875,510 B1 * 1/2018 Kasper .................. G06Q 40/12
(Continued)

FOREIGN PATENT DOCUMENTS

CN    106878071 A    6/2017
CN    107070874 A    8/2017
(Continued)

OTHER PUBLICATIONS

Tencent Technology, WO, PCT/CN2019/104057, Sep. 28, 2019, 5 pgs.
(Continued)

*Primary Examiner* — Oleg Korsak
(74) *Attorney, Agent, or Firm* — Morgan, Lewis & Bockius LLP

(57) ABSTRACT

A method for electing a representative node device for a blockchain system includes: receiving IP address information of a first node device, the first node device being in a candidate state for a representative node device; receiving, from the first node device, an IP address obtaining request for requesting IP address information of a representative node device; when the first node device is determined to be a representative node device of the blockchain system elected in a current election process, transmitting, to the first
(Continued)

node device, an IP address list comprising IP address information of representative node devices elected in the current election process; and when the first node device is determined not to be a representative node device of the blockchain system elected in the current election process, skipping the IP address obtaining request.

20 Claims, 5 Drawing Sheets

(58) Field of Classification Search
CPC ..... H04L 9/0643; H04L 63/20; H04L 63/205; H04L 67/1051
See application file for complete search history.

(56) References Cited

U.S. PATENT DOCUMENTS

| | | | |
|---|---|---|---|
| 9,992,022 B1* | 6/2018 | Chapman | H04L 9/3236 |
| 10,686,590 B2* | 6/2020 | Santilli | G06F 16/23 |
| 10,826,681 B1* | 11/2020 | Dayan | G06F 9/4401 |
| 11,251,975 B1* | 2/2022 | Wahla | G06Q 20/02 |
| 11,375,010 B2* | 6/2022 | Cai | H04L 9/3236 |
| 2005/0094574 A1* | 5/2005 | Han | H04W 40/32 370/254 |
| 2007/0260878 A1 | 11/2007 | Urivskiy et al. | |
| 2018/0157999 A1 | 6/2018 | Arora | |
| 2018/0309567 A1* | 10/2018 | Wooden | G06F 21/57 |
| 2018/0349621 A1* | 12/2018 | Schvey | H04L 63/04 |
| 2019/0020471 A1* | 1/2019 | Santilli | H04L 9/0643 |
| 2019/0149550 A1* | 5/2019 | Brakeville | G06F 21/64 726/5 |
| 2020/0026625 A1* | 1/2020 | Konka | G06F 11/2028 |
| 2020/0052954 A1* | 2/2020 | Han | H04L 41/0668 |
| 2021/0248675 A1* | 8/2021 | Guo | G06Q 20/3829 |
| 2021/0256016 A1* | 8/2021 | Gramoli | G06F 16/2365 |
| 2021/0258375 A1* | 8/2021 | Cai | H04L 63/123 |

FOREIGN PATENT DOCUMENTS

| | | |
|---|---|---|
| CN | 107395403 A | 11/2017 |
| CN | 107423124 A | 12/2017 |
| CN | 108156203 A | 6/2018 |
| CN | 108182635 A | 6/2018 |
| CN | 108259235 A | 7/2018 |
| CN | 108305056 A | 7/2018 |
| CN | 109167660 A | 1/2019 |
| JP | 2009021395 A | 1/2009 |

OTHER PUBLICATIONS

Tencent Technology, IPRP, PCT/CN2019/104057, Mar. 9, 2021, 6 pgs.
Tencent Technology, ISR, PCT/CN2019/104057, Nov. 28, 2019, 2 pgs.

* cited by examiner

METHOD AND APPARATUS FOR ELECTING REPRESENTATIVE NODE DEVICE, COMPUTER DEVICE, AND STORAGE MEDIUM

CROSS REFERENCE TO RELATED APPLICATIONS

This application is a continuation application of PCT Patent Application No. PCT/CN2019/104057, entitled "METHOD AND APPARATUS FOR ELECTING REPRESENTATIVE NODE DEVICE, AND COMPUTER DEVICE AND STORAGE MEDIUM" filed on Sep. 2, 2019, which claims priority to Chinese Patent Application No. 201811046269.8, entitled "METHOD AND APPARATUS FOR ELECTING REPRESENTATIVE NODE DEVICE, COMPUTER DEVICE, AND STORAGE MEDIUM" filed on Sep. 7, 2018, all of which are incorporated by reference in their entirety.

FIELD OF THE TECHNOLOGY

This application relates to the field of blockchain technologies, and in particular, to a method and an apparatus for electing a representative node device, a computer device, and a storage medium.

BACKGROUND OF THE DISCLOSURE

In recent years, with the development of network technologies, blockchain systems are widely applied in life. A blockchain system may be formed by a plurality of node devices. Each node device may use blocks to store transaction data, and sequentially combine blocks in time order to form a chain data structure, so as to form a distributed ledger in the blockchain system.

At present, node devices may generate blocks by using the following process. When a transaction occurs in any node device, the node device may record transaction data, and broadcast the transaction data in a blockchain system, so that a node device in the blockchain system may receive the transaction data. After receiving the transaction data, the node device in the blockchain system may package the transaction data and generate a new block, and verify the new block by using a consensus mechanism. After the new block is verified, the node devices may add the new block to a blockchain configured on the node device.

In the process of generating the blocks by the node devices, to improve the working efficiency of the blockchain system, a representative node device may be elected to generate blocks in place of all node devices. Next, in the process of generating blocks, the representative node device may broadcast transaction data in the blockchain system by using peer to peer (P2P) broadcasting. To improve the communication efficiency, representative node devices may alternatively perform direct communication to exchange data. In other words, the representative node devices may directly transmit or receive transaction data by using each other's internet protocol (IP) addresses. However, if a representative node device uses direct communication to transfer transaction data, all node devices that communicate with the representative node device need to know the IP address of the representative node device. Once the IP address of the representative node device is exposed, the representative node device is extremely vulnerable to attacks, affecting the normal operation of the blockchain system. In this case, there is an urgent need for a method for electing a representative node device that can ensure the security of the representative node device.

SUMMARY

Embodiments of this application provide a method and an apparatus for electing a representative node device, a computer device, and a storage medium.

A method of electing a representative node device for a blockchain system including multiple node devices is performed by a target server, the method comprising:
  receiving internet protocol (IP) address information of a first node device in the blockchain system, the first node device being in a candidate state for a representative node device of the blockchain system;
  receiving an IP address obtaining request from the first node device, the IP address obtaining request being used for requesting IP address information of a representative node device of the blockchain system;
  when the first node device is determined to be a representative node device of the blockchain system elected in a current election process, transmitting an IP address list to the first node device, the IP address list comprising IP address information of representative node devices elected in the current election process; and
  when the first node device is determined not to be a representative node device of the blockchain system elected in the current election process, skipping the IP address obtaining request.

A target server includes a processor and a memory, the memory storing computer-readable instructions, the computer-readable instructions, when executed by the processor, causing the target server to perform the steps of the aforementioned method for electing a representative node device for a blockchain system.

A non-transitory computer-readable storage medium stores computer-readable instructions that, when executed by a processor of a target server for electing a representative node device for a blockchain system including multiple node devices, causing the target server to perform the steps of the aforementioned method for electing a representative node device for a blockchain system.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Certainly, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Figure 1:
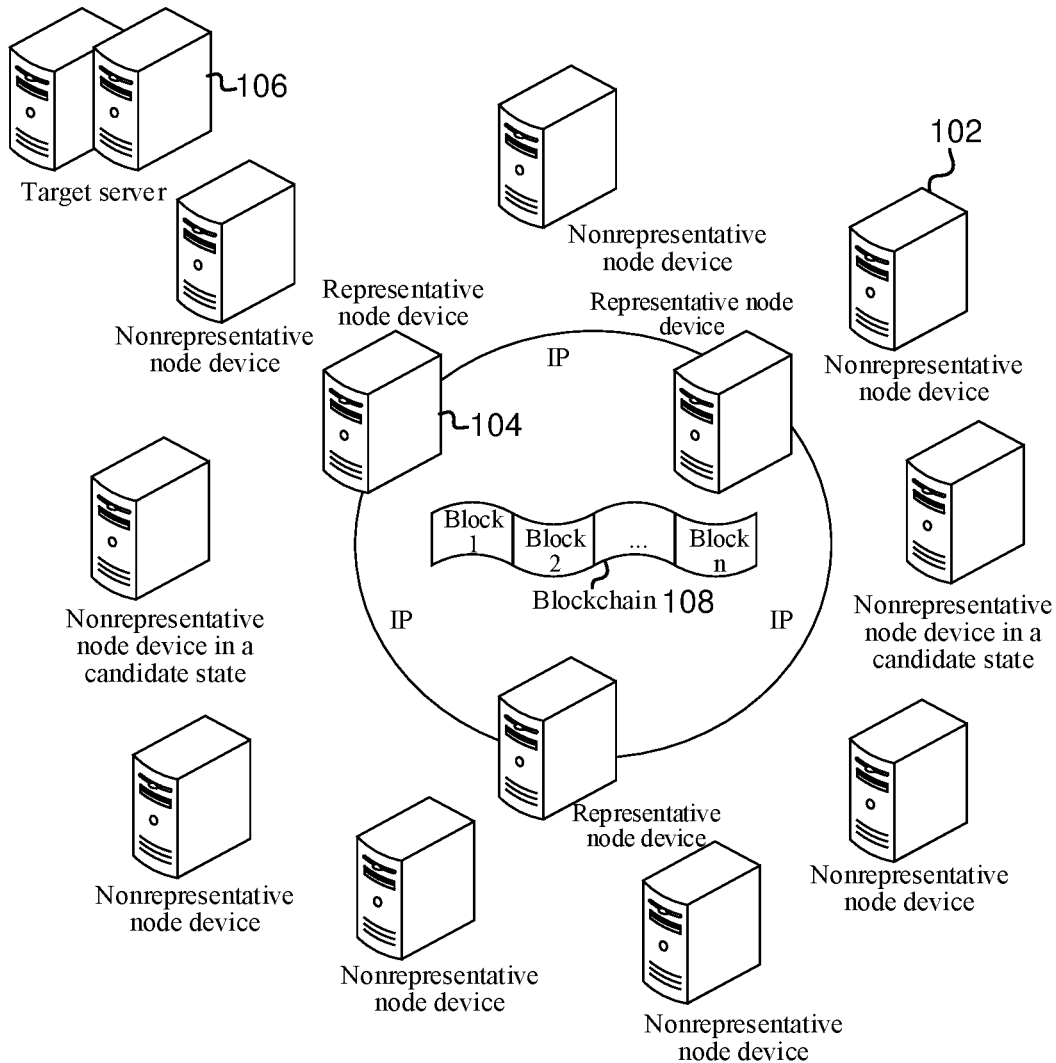
FIG. 1 is a schematic structural diagram of a blockchain system according to an embodiment of this application.

FIG. 1 is a schematic structural diagram of a blockchain system according to an embodiment of this application. Referring to FIG. 1, the system includes a plurality of servers and further includes a target server 106. In a possible implementation, the target server may be alternatively a target server configured outside the blockchain system and associated with the blockchain system. The term "a plurality of" mentioned in the embodiments of this application means "more than one".

One same blockchain may be configured for a plurality of servers. In other words, the plurality of servers may form a blockchain system, and the servers are node devices in the blockchain system. The plurality of servers may be a plurality of servers that belong to the same organization, may be a plurality of servers that belong to different organizations, and may be a plurality of servers that belong to ordinary users.

As the node device in the blockchain system, the plurality of servers may receive transaction data. However, when the blockchain system records transaction data, the node devices may be categorized into a representative node device (e.g., representative node device 104) and a nonrepresentative node device (e.g., nonrepresentative node device 102) for different uses. The representative node device is configured to generate a block and a consensus block. The nonrepresentative node device is configured to receive the block that is generated by the representative node device and on which a consensus is reached, and store the verified block in the target blockchain (e.g., blockchain 108). In a candidate state of the representative node device, the nonrepresentative node device may be elected as the representative node device by election.

The target server may be configured to: store IP address information of the node device in a candidate state in the blockchain system, search a list of newly elected representative node devices in the blockchain system, and transmit IP address information of all the newly elected representative node devices to the newly elected representative node devices.

For the process of recording transaction data by the blockchain system, the following process is used as an example.

When any node device in the blockchain system receives transaction data, the node device needs to broadcast the received transaction data in the blockchain system for another node device to receive the transaction data. After the representative node device in the blockchain system receives the transaction data, the representative node device generates a block based on the transaction data, so that the representative node device may perform a consensus on the block. After the representative node devices reach a consensus on the block, the representative node device broadcasts the block in the blockchain system. After receiving the block broadcast by the representative node device, a nonrepresentative node device verifies the block and stores the verified block on the target blockchain configured by the nonrepresentative node device.

The consensus used in the embodiments of this application is that a plurality of node devices in the blockchain system verify the data respectively. When the data is verified by any node device, the node device broadcasts a verification success message in the blockchain system. When the verification success message received by any node device conforms to a preset consensus strategy, it is determined that a consensus is reached on the data.

A representative node device in the blockchain system is used as an example for the consensus. The consensus may be achieved by using a proof of work (POW) mechanism. The process is described as follows: The representative node device in the blockchain system generates a block. The representative node device calculates a hash value of a block header of the generated block to determine whether the hash value is less than a current target value. If the hash value is greater than the target value, the representative node device modifies a random number in the generated block and recalculates a hash value. If the hash value calculated by the representative node device is less than the target value, the representative node device transmits the block to another representative node device according to the IP address of the another representative node device. After receiving the block, the another representative node device verifies the block. When most of other representative node devices agree on the validity of the block, the consensus is reached.

The process in which the representative node devices use each other's IP addresses to transmit blocks to another representative node device is direct communication.

For the system provided in the embodiments of the application, all node devices in a blockchain system do not need to generate blocks, and most of the node devices in the blockchain system do not need to reach a consensus on a generated block and then verify whether transaction data can be stored. Transaction data can be recorded in the blockchain system after only a representative node device generates a block and a consensus block and a nonrepresentative node device completes verification. Therefore, the working efficiency of the blockchain system is improved, and the representative node devices in the blockchain system may use direct communication to reach a consensus on a block, thereby further improving the working efficiency of the representative node device, so as to further improve the working efficiency of the blockchain system.

Figure 2:
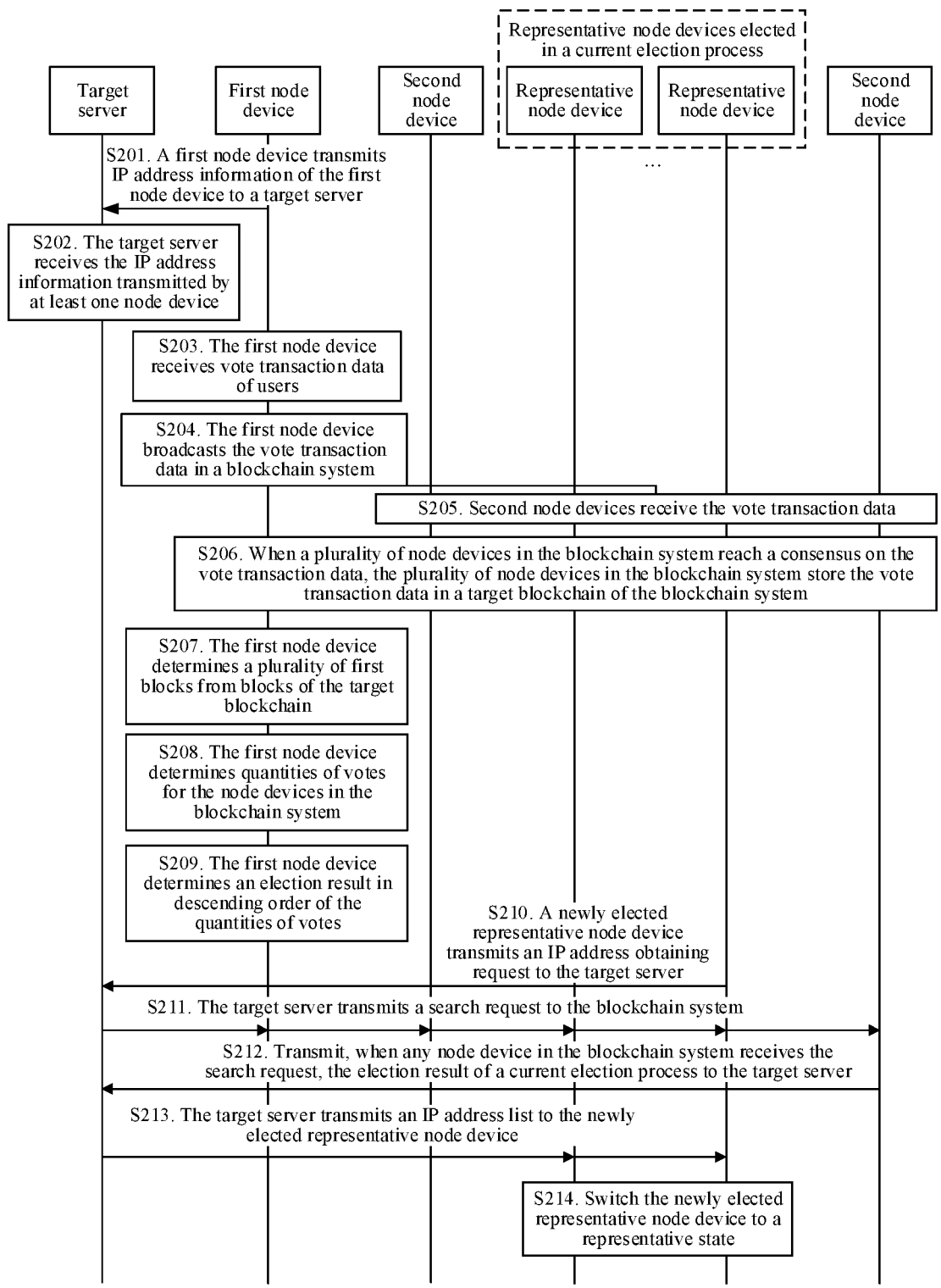
FIG. 2 is a flowchart of a method for electing a representative node device according to an embodiment of this application.

Next, a process of generating a IP address obtaining request by a representative node device in the blockchain system is described below by using a specific embodiment:

FIG. 2 is a flowchart of a method for electing a representative node device according to an embodiment of this application. Referring to FIG. 2. A procedure of the method provided in this embodiment of this application includes the following steps:

S201. A first node device transmits IP address information of the first node device to a target server.

The first node device in a blockchain system is any node device in the blockchain system. The IP address information may include an IP address and a public key. The target server may use the public key to select the IP address of the representative node device.

In this embodiment of this application, for example, the first node device is a node device in a candidate state. The node device in the candidate state is a node device that is a candidate for a representative node device. The node device in the candidate state may be a node device with certain qualification. For example, the qualification is that the performance meets a preset performance requirement or the credit meets a preset credit requirement.

Corresponding representative node devices in the first election process in the blockchain system are initial representative node devices set by the blockchain system during initialization. Corresponding representative node devices in each subsequent election process are representative node devices elected last time.

S202. The target server receives the IP address information transmitted by at least one node device.

In this embodiment, the at least one node device may be at least one node device in a candidate state. The target server receives a plurality of pieces of IP address information, so that the target server may select the IP addresses of the representative node devices based on the plurality of pieces of IP address information.

Certainly, the at least one node device may further include a node device that is not in a candidate state. This is not limited in this embodiment of the present application.

S203. The first node device receives vote transaction data of users.

In this embodiment, the vote transaction data is data that the users use user equipment to vote for at least one node device in the candidate state in the blockchain system.

S204. The first node device broadcasts the vote transaction data in a blockchain system.

With the broadcasting, all the node devices in the blockchain system can receive the vote transaction data. In this embodiment of this application, the first node device may directly receive the vote transaction data generated by a user logging in to the first node device to vote. However, in some embodiments, the first node device may directly receive the vote transaction data broadcast by another node device after a user logs in to the another node device to vote. This is not specifically limited in this embodiment of this application.

S205. Second node devices receive the vote transaction data.

The second node device is a node device other than the first node device in the blockchain system. "First", "second", and other attributes mentioned in the embodiments of this application are not used to distinguish between the functions of the node device, but are only used to distinguish between different node devices.

S206. When a plurality of node devices in the blockchain system reach a consensus on the vote transaction data, the plurality of node devices in the blockchain system store the vote transaction data in a target blockchain of the blockchain system.

In this embodiment of this application, when a plurality of node devices reach a consensus on the vote transaction data, it may be that a plurality of representative node devices in the blockchain system reach a consensus on the vote transaction data. For a blockchain system that holds an election for the first time, the foregoing initial representative node device may be used as a node participating in the consensus process. Subsequently, after a plurality of representative node devices are elected, the plurality of elected representative node devices may be switched to an operation state of a representative node device to participate in the consensus and block generation process of the entire blockchain system. However, the node device that is not elected as a representative node device operates in a state of a nonrepresentative node device and does not participate in the consensus and block generation process of the entire blockchain system.

S207. When a quantity of generated blocks reaches a preset quantity, the first node device determines a plurality of first blocks from blocks of the target blockchain. The plurality of first blocks are configured to store the vote transaction data of the node devices.

In step S207, the first node device may search blocks of the target blockchain based on the vote transaction type, to obtain a block storing the vote transaction type as the first block.

In this embodiment of this application, a plurality of elections may be held during the operation of the entire blockchain system to avoid the system operation problems caused by occurrences in a representative node device, so as to ensure the stable operation of the blockchain system based on the representative node device. For example, a representative node device may run abnormally or have credit problems.

The generated block is a block generated after the last election. An election is held once when the generated block reaches the first preset quantity, to ensure a switching time of the representative node devices, that is, how often the representative node devices are switched, so that frequent switching of representative node devices can be avoided, and the normal operation of the entire blockchain system can be avoided.

It may be understood that the generated block includes both blocks generated based on the vote transaction data and blocks generated based on other transaction data. Certainly, the block may further include blocks generated based on the vote transaction data and other transaction data. Details are not described in detail in this embodiment of this application herein.

All the node devices in the blockchain system perform the process of step S207. Details are not described herein in this embodiment of this application.

S208. The first node device determines, according to the vote transaction data stored in the plurality of first blocks, quantities of votes for the node devices in the blockchain system.

The vote transaction data includes a transaction type, a list of the node devices that receive votes, and a private key signature of a voting user. Therefore, a quantity of votes that a node device receives may be counted for the vote transaction data stored in each first block.

In this embodiment of this application, a voting pattern in the blockchain system may be an incremental voting pattern. In the incremental voting pattern, the node device that receives votes is indicated in a vote transaction and past voting results are retained. For example, if a user has voted for node devices A, B, and C, and a voting object a current time is a node device D, the user may vote directly for the node device D. A list of node devices that receive votes in the vote transaction data of the node device D is to carry a public key of the node device D. In other words, the user has voted for the four node devices A, B, C and D through a plurality of rounds of votes.

Based on the foregoing incremental voting pattern, the votes of the node device that receives votes may further be withdrawn. For example, if a user has voted for node devices A, B, and C and the user wants to withdraw the vote for a node device C, the user may directly indicate the withdrawal of the vote for the node device C in the vote transaction data in a next vote.

Other patterns may be used in a vote and a process of counting the vote. This is not specifically limited in this application.

The foregoing steps S207 and S208 are actually an example of how to obtain the vote transaction data corresponding to the node devices in a candidate state. Other methods may be used in the process. This is not specifically limited in this application.

S209. The first node device determines an election result in descending order of the quantities of votes. The election result includes a public key of a second preset quantity of representative node devices elected by the blockchain system in a current election process and the quantity of votes for the representative node devices.

The second preset quantity may be consistent with a quantity of representative node devices that are currently working. In other words, through a setting of the second preset quantity, it can be ensured that the representative node devices that are currently working can all be replaced by the elected representative node devices. Certainly, the second preset quantity may be changed. For example, the second preset quantity may be changed according to a change of a quantity of node devices in the blockchain system. When the quantity of node devices increases, the second preset quantity may be increased.

The first node device may determine, according to an election result determined by the first node device, whether the first node device is a newly elected representative node device a current time. In other words, any node device in the blockchain system may determine, according to an election result counted by the node device, whether the node device is a newly elected representative node device the current time, and the identities of other newly elected representative node devices the current time.

The foregoing steps S207 to S209 are an implementation that the first node device determines, according to the quantities of votes for the plurality of node devices, a plurality of representative node devices in the blockchain system, that is, the process of determining, according to the vote transaction data stored in the plurality of first blocks, the second preset quantity of representative node devices in the blockchain system.

The foregoing election process is merely an example. In some embodiments, other election methods may further be used to elect the representative node device in the blockchain system. This is not limited in this embodiment of this application.

S210. A newly elected representative node device transmits an IP address obtaining request to the target server.

The IP address obtaining request carries a public key of the node device, so that the target server may determine whether the node device transmitting the IP address obtaining request is a newly elected representative node device a current time.

Before the newly elected representative node device transmits the IP address obtaining request to the target server, the node device needs to determine, according to an election result determined by the node device, whether the node device is a newly elected representative node device. If yes, the newly elected representative node device transmits the IP address obtaining request to the target server.

S211. When the current election process ends, the target server transmits a search request to the blockchain system, the search request being used for searching for an election result of the current election process.

When the target server transmits the search request to the blockchain system, the target server may transmit a search request to any node device in the blockchain system, may transmit a search request to a specific node device in the blockchain system, or may directly transmit a search request to the blockchain system. This is not specifically limited in this application.

S212. Transmit, when any node device in the blockchain system receives the search request, the election result of a current election process to the target server.

S213. When the target server receives the election result and determines that the first node device is a representative node device elected in the current election process, transmit an IP address list to the first node device. The IP address list includes the IP address information of the representative node device elected in the current election process.

The election result includes a public key of a plurality of representative node devices. Therefore, when receiving the election result, the target server may determine, according to the public key of the plurality of representative node devices and the public key of the first node device, whether the first node device is an elected representative node device elected in the current election process. If yes, the IP address information of the representative node device is selected from the received IP address list according to the public key of the plurality of representative node devices, and the IP address list is generated based on the IP address information of the representative node devices. When determining that the first node device is a newly elected node device a current time, the target server transmits the IP address list to the first node device. If the target server determines that the first node device is not a newly elected node device a current time, the target server skips responding to the IP address obtaining request transmitted by the first node device.

Certainly, the foregoing process is described by using an example that the process of selecting an IP address is implemented after it is determined that a node device is a representative node device. In some embodiments, the target server may synchronously perform the determination of the first node device and the selection of the IP address after receiving the election result, and then determine, based on a determination result, whether to transmit the generated IP address list to the first node device.

The foregoing process is described by using an example that the target server searches for a representative node device when receiving the IP address obtaining request. In some embodiments, the search process does not need to be triggered by using the IP address obtaining request, and the target server may automatically perform, in a case that the election of the blockchain system ends, a search and generate an IP address list based on the search result, to reduce the time consumption of real-time search and real-time generation. The specific time of search is not limited in this embodiment of this application.

In some embodiments, instead of transmitting the IP address obtaining request to the target server, the newly elected representative node device may further actively transmit the IP address list to the newly elected representative node devices after the target server receives the election result, so as to reduce signaling interaction.

S214. After receiving the IP address list, switch the newly elected representative node device to a representative state.

In the method provided in this embodiment of this application, the target server may manage the IP addresses of all candidate node devices. When the election succeeds, only the IP address list including the IP addresses of all the newly elected representative node devices is transmitted to the newly elected representative node device, so that the IP addresses of these representative node devices can only be received by the newly elected representative node device a current time, thereby reducing the exposure rate of the IP addresses of the representative node devices and ensuring the security of the representative node devices.

Furthermore, in the election process, different vote counting methods can be selected to elect representative node devices for the blockchain system, to provide more flexible election methods. When the first preset quantity of blocks are generated after an interval, quantities of votes for the node devices in the blockchain system are counted and are sorted in descending order, and the representative node devices are then elected. By using this method, the switching time of representative node devices may further be controlled, so as to avoid frequent switching of representative node devices and avoid abnormal operation of the blockchain system. To maintain the normal operation of the blockchain system, a plurality of elections are held in the blockchain system to prevent some representative node devices that cannot work normally from being replaced. In the process of implementing a consensus, the representative node devices in the blockchain system directly communicate by using each other's IP addresses, thereby further improving the working efficiency of the blockchain system.

Figure 3:
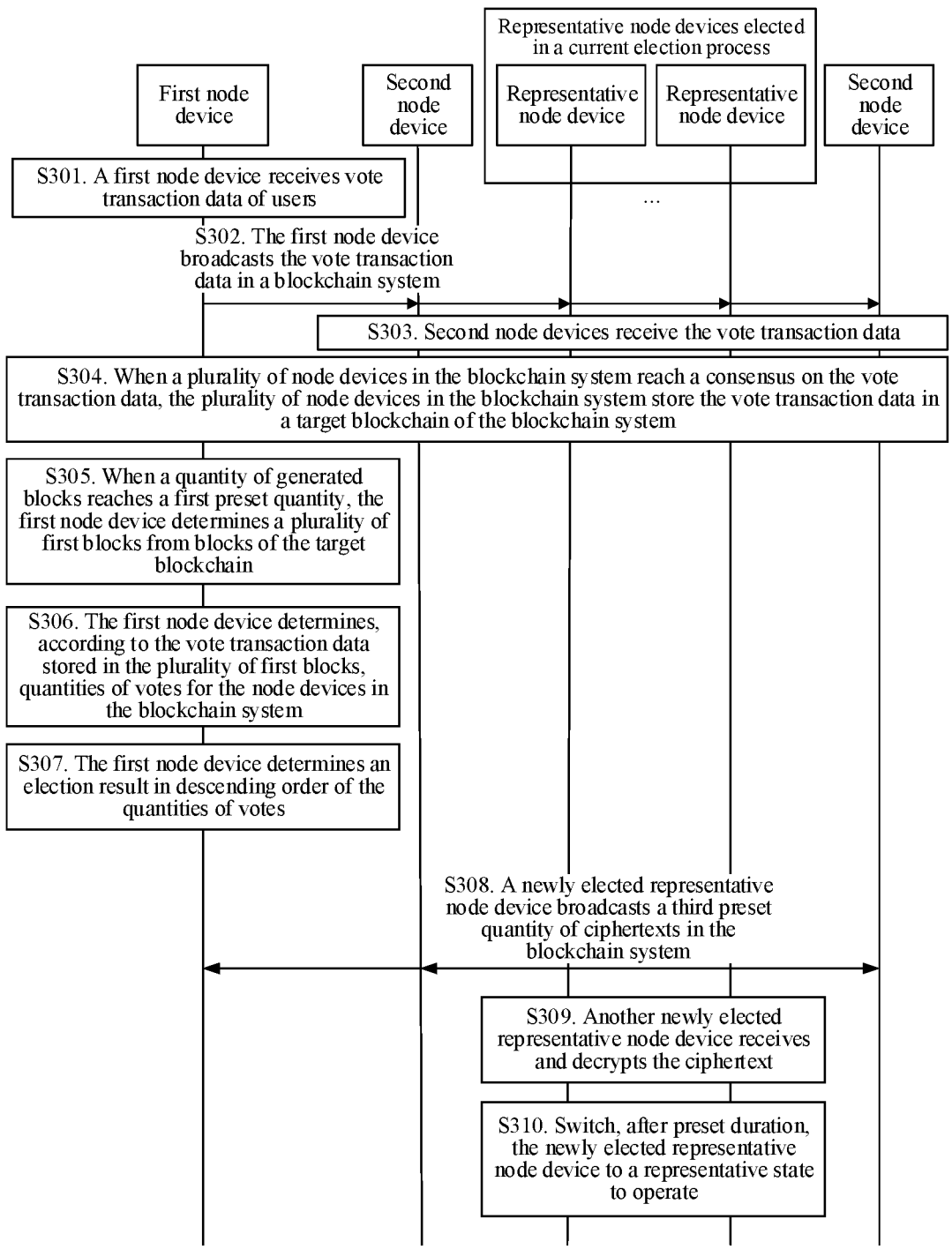
FIG. 3 is a flowchart of a method for electing a representative node device according to an embodiment of this application.

In the foregoing embodiments, a method for electing a representative node device that reduces the exposure rate of the IP addresses of representative node devices may be used, and other methods for electing a representative node device that reduce the exposure rate of the IP addresses of representative node devices may be used. A specific embodiment is used herein for description as follows:

FIG. 3 is a flowchart of a method for electing a representative node device according to an embodiment of this application. Referring to FIG. 3, a procedure of the method provided in this embodiment of this application includes the following steps:

S301. A first node device receives vote transaction data of users.

In this embodiment of this application, for example, users use user equipment to initiate a vote transaction to a first node device. A blockchain system performs initialization and determines initial representative node devices. The initial representative node devices are node devices configured to perform a block generation and a block consensus in the blockchain system before an election is held. In the initialization stage, a public key of the initial representative node devices may be stored in the genesis block of the blockchain, so that each node device in the blockchain system knows the public key of the initial representative node device.

In addition, any initial representative node device is set to know the IP address information of all the initial representative node devices, while a non-initial representative node device in the blockchain system does not know the IP address information of the initial representative node devices.

S302. The first node device broadcasts the vote transaction data in a blockchain system.

The vote transaction data is data that users vote on at least one first node device of the blockchain system.

S303. Second node devices receive the vote transaction data.

S304. When a plurality of node devices in the blockchain system reach a consensus on the vote transaction data, the plurality of node devices in the blockchain system store the vote transaction data in a target blockchain of the blockchain system.

In this embodiment of this application, when a plurality of node devices reach a consensus on the vote transaction data, it may be that a plurality of representative node devices in the blockchain system reach a consensus on the vote transaction data. For a blockchain system that holds an election for the first time, the foregoing initial representative node device may be used as a node participating in the consensus process. Subsequently, after a plurality of representative node devices are elected, the plurality of elected representative node devices may be switched to an operation state of a representative node device to participate in the consensus and block generation process of the entire blockchain system. However, the node device that is not elected as a representative node device operates in a state of a nonrepresentative node device and does not participate in the consensus and block generation process of the entire blockchain system.

S305. When a quantity of generated blocks reaches a first preset quantity, the first node device determines a plurality of first blocks from blocks of the target blockchain. The plurality of first blocks are configured to store the vote transaction data of the node devices.

All the node devices in the blockchain system perform the process of step S305.

S306. The first node device determines, according to the vote transaction data stored in the plurality of first blocks, quantities of votes for the node devices in the blockchain system.

The voting pattern in the blockchain system may be a full vote pattern. In the full vote pattern, node devices that receives votes need to be indicated in each transaction, and the last vote is invalid. For example, a user has voted for node devices A and B. Objects in a next vote are node devices C and D. In the next vote by the user, it needs to be indicated that the user votes for node devices C and D, and the votes for the node devices A and B in the last vote need to be directly overridden.

Other patterns may be used in a vote and a process of counting the vote. This is not specifically limited in this application.

The foregoing steps S305 and S306 are actually an example of how to obtain the vote transaction data corresponding to the node devices in a candidate state. Other methods may be used in the process. This is not specifically limited in this application.

S307. The first node device determines an election result in descending order of the quantities of votes. The election result includes a public key of a second preset quantity of representative node devices in the blockchain system and the quantities of votes for the representative node devices.

The second preset quantity may be consistent with a quantity of representative node devices that are currently working. In other words, through a setting of the second preset quantity, it can be ensured that the representative node devices that are currently working can all be replaced by the elected representative node devices. Certainly, the second preset quantity may be changed. For example, the second preset quantity may be changed according to a change of a quantity of node devices in the blockchain system. When the quantity of node devices increases, the second preset quantity may be increased.

The first node device may determine, according to an election result determined by the first node device, whether the first node device is a newly elected representative node device a current time. In other words, any node device in the blockchain system may determine, according to an election result determined by the node device, whether the node device is a newly elected representative node device a current time, and the identities of other newly elected representative node devices a current time.

Therefore, the process of determining an election result in step S307 is a process of determining the identity of the first node device and the identities of the representative node devices elected in the current election process.

The foregoing steps S305 to S307 are an implementation that the first node device determines, according to the quantities of votes for the plurality of node devices, a plurality of representative node devices in the blockchain system, that is, the process of determining, according to the vote transaction data stored in the plurality of first blocks, the second preset quantity of representative node devices in the blockchain system.

S308. A newly elected representative node device broadcasts a third preset quantity of ciphertexts in the blockchain system.

Therefore, in the current election process, all other newly elected representative node devices can receive the ciphertext and decrypt the ciphertext.

The third preset quantity is set, so that other newly elected representative node devices in the current election process can all receive ciphertexts that the representative node devices can decrypt. The third preset quantity may be one less than the quantity of representative node devices that are currently working in the blockchain system.

A process of generating the ciphertext of the third preset quantity of is as follows: First, the IP address information of the newly elected representative node device is duplicated into a third preset quantity of pieces of IP address information. Next, a public key of representative node devices elected in the current election process is used to respectively encrypt the preset quantity of pieces of IP address information. Finally, the third preset quantity of ciphertexts is obtained. In an embodiment, a private key of newly elected representative node devices is used to encrypt original IP address information of the newly elected representative node devices, and IP address information of the newly elected representative node devices is obtained.

When the ciphertext is broadcast in the blockchain system by the newly elected representative node device, it can be ensured that only the newly elected representative node device can decrypt the ciphertext, thereby reducing the exposure rate of the IP address information of the representative node devices, and ensuring the security of the representative node devices in the blockchain system.

The node devices in the blockchain system may form a P2P network, and the node devices communicate with each other in the form of broadcast. To improve the efficiency of communication between the representative node devices, the representative node devices may further communicate by using each other's IP addresses. For this embodiment of this application, the newly elected representative node devices do not know each other's IP addresses at present. A newly elected representative node device may broadcast a ciphertext in the P2P network, so that other newly elected representative node devices may receive the ciphertext, to obtain the IP addresses of the newly elected representative node devices through decryption. Therefore, during working, the newly elected representative node devices may directly communicate by using each other's IP addresses, so as to improve the working efficiency of the representative node devices while it is ensured that the IP addresses are hidden from devices other than the representative node devices.

S309. Another newly elected representative node device receives and decrypts the ciphertext.

In the decryption, the newly elected representative node device may decrypt, based on the private key of the representative node device, the ciphertext encrypted by using the public key of the representative node device.

S310. Switch, after preset duration, the newly elected representative node device to a representative state to operate.

The preset duration is set to ensure a sufficient time, so that all the elected representative node devices in the current election process can receive the ciphertext transmitted by other newly elected representative node devices, and decrypt the ciphertexts, so as to ensure that all the newly elected representative node devices can obtain the IP address information of other new representative node devices.

For the method provided in this embodiment of this application, the newly elected representative node devices may broadcast the encrypted IP addresses in the blockchain system. In the encryption method of the IP addresses, encryption may be performed by using the public key of the representative node devices elected in the current election process, so that the encrypted IP addresses can only be decrypted by the newly elected representative node devices. In other words, only the representative node devices elected in the current election process can know the IP addresses, thereby reducing the exposure rate of the IP addresses of the representative node devices, and ensuring the security of the representative node devices.

Furthermore, the elected representative node devices may generate blocks in place of all the node devices in the blockchain system, and may further complete a consensus on a new block, thereby improving the working efficiency of the blockchain system. In addition, in the process of performing a consensus, the representative node devices in the blockchain system directly communicate by using each other's IP addresses, thereby further improving the working efficiency of the blockchain system.

Figure 4:
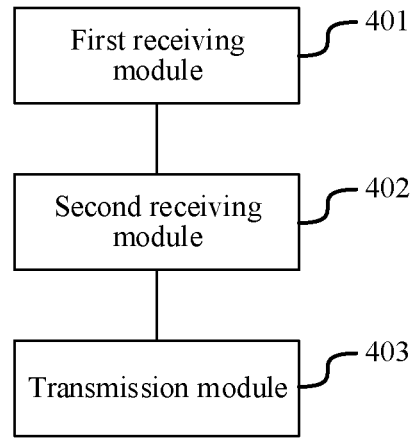
FIG. 4 is a schematic structural diagram of an apparatus for electing a representative node device according to an embodiment of this application.

FIG. 4 is a schematic structural diagram of an apparatus for electing a representative node device according to an embodiment of this application. FIG. 4 includes a first receiving module 401, a second receiving module 402, and a transmission module 403.

The first receiving module 401 is connected to the second receiving module 402, and is configured to receive IP address information of at least one node device in a blockchain system.

The second receiving module 402 is connected to the transmission module 403, and is configured to receive an IP address obtaining request of a first node device, the IP address obtaining request being used for requesting IP address information of a representative node device.

The transmission module 403 is configured to: transmit, in a case that the first node device is a representative node device elected in a current election process, an IP address list to the first node device, the IP address list including IP address information of representative node devices elected in the current election process; and skip responding to the IP address obtaining request in a case that the first node device is not a representative node device elected in the current election process.

In an embodiment, the apparatus further includes:
 a search module, configured to transmit, after the current election process ends, a search request to the blockchain system, the search request being used for searching for representative node devices elected in the current election process; and a third receiving module, configured to receive a public key of the representative node devices.

In an embodiment, the apparatus further includes:
a generation module, configured to: select, according to the public key of the representative node devices, IP address information of the representative node devices from the received IP address information, and generate the IP address list based on the IP address information of each representative node device.

The apparatus provided in this embodiment of this application may store the IP address of the node device in the blockchain system, and search, based on the IP address obtaining request of the first node device in the blockchain system, for the representative node device elected in a current election process in the blockchain system. If the first node device is a new representative node device, the IP address information of all the newly elected representative node devices is transmitted to the first node device, or otherwise, the apparatus skip responding. It can be seen that the IP addresses of the newly elected representative node devices are only exposed to all the newly elected representative node devices, thereby reducing the exposure rate of the representative node device in the blockchain system, ensuring the security of the new representative node devices, and maintains the normal operation of the blockchain system.

Figure 5:
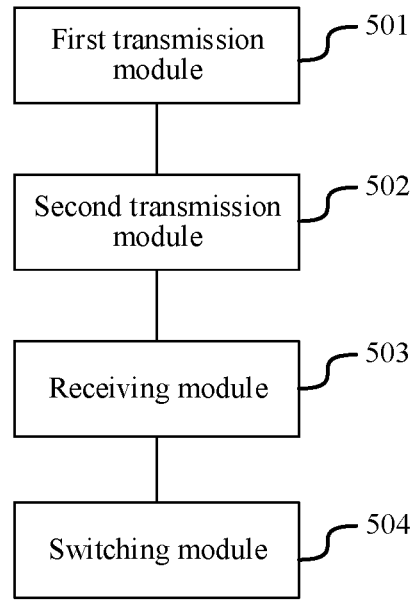
FIG. 5 is a schematic structural diagram of an apparatus for electing a representative node device according to an embodiment of this application.

FIG. 5 is a schematic structural diagram of an apparatus for electing a representative node device according to an embodiment of this application. FIG. 5 includes a first transmission module 501, a second transmission module 502, a receiving module 503, and a switching module 504.

The first transmission module 501 is connected to the second transmission module 502, and is configured to transmit, in a case that the node device is in a candidate state, IP address information of the node device to a target server.

The second transmission module 502 is connected to the receiving module 503, and is configured to transmit, in a case that the node device is elected as a representative node device in a current election process, an IP address obtaining request to the target server, the IP address obtaining request carrying a public key of the node device.

The receiving module 503 is connected to the switching module 504, and is configured to receive an IP address list returned by the target server, the IP address list including IP address information of representative node devices elected in the current election process.

The switching module 504 is configured to switch the node device to a representative state to operate.

The apparatus provided in this embodiment may be considered as a candidate node device for a representative node device in the blockchain system. The IP address of the node device may be stored in the target server in advance. Once elected as the representative node device, the node device may transmit the IP address obtaining request to the target server, and then receive the IP address information of the representative node devices elected in a current election process. Therefore, it is ensured that the newly elected representative node devices may obtain the IP address information of the representative node devices elected in the current election process. The IP address information of the newly elected representative node devices can be known by the newly elected representative node devices. During the consensus, the representative node devices in the blockchain system may directly communicate based on each other's IP addresses, thereby improving the working efficiency of the representative node devices and further improving the working efficiency of the blockchain system.

An embodiment of this application provides an apparatus for electing a representative node device. The apparatus includes a duplication module, an encryption module, a broadcast module, and a switching module. The duplication module is configured to duplicate, in a case that the node device is elected as a representative node device in a current election process, the IP address information of the node device into the preset quantity of pieces of IP address information. The encryption module is configured to encrypt the preset quantity of pieces of IP address information respectively by using a public key of representative node devices elected in the current election process, to obtain a preset quantity of ciphertexts. The broadcast module is configured to broadcast the preset quantity of ciphertexts. The switching module is configured to switch, after preset duration, the node device to a representative state to operate.

The encryption module is further configured to encrypt, before the duplication module duplicates the IP address information of the node device into the preset quantity of pieces of IP address information, original IP address information of the node device by using a private key of the node device, to obtain the IP address information of the node device.

The apparatus for electing a representative node device provided in this embodiment of this application further includes a voting module. The voting module is configured to take a vote on at least one node device in the blockchain system before the node device is a representative node device elected in a current election process, the vote being a vote taken to elect a representative node device in the blockchain system.

The apparatus for electing a representative node device provided in this embodiment of this application further includes a determination module. The determination module is configured to determine, according to a quantity of votes for the at least one node device after the vote is taken on the at least one node device in the blockchain system, a preset quantity of representative node devices in the blockchain system.

An optional embodiment of this application may be formed by using any combination of all the foregoing optional technical solutions, and details are not described herein.

For the apparatus for electing a representative node device provided in the foregoing embodiments, division of the foregoing functional modules is merely an example for description. In an actual application, the foregoing functions may be assigned to and completed by different modules as needed, that is, the internal structure of the apparatus is divided into different functional modules to implement all or some of the functions described above. In addition, the method for electing the representative node device provided in the foregoing embodiments has the same concept as the method embodiments. For a specific implementation process of the apparatus, reference may be made to the method embodiments, and details are not described herein again. In this application, the term "module" refers to a computer program or part of the computer program that has a predefined function and works together with other related parts to achieve a predefined goal.

Figure 6:
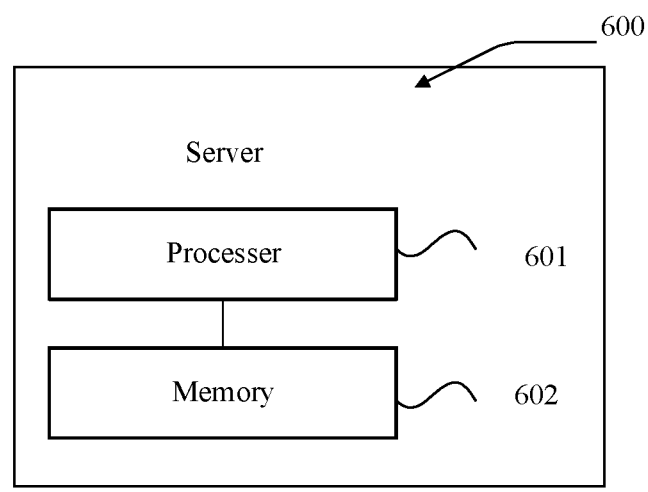
FIG. 6 is a schematic structural diagram of a server according to an embodiment of this application.

FIG. 6 is a schematic structural diagram of a computer device according to an embodiment of this application. The computer device may be a server 600. The server 600 may vary greatly due to different configuration or performance, and may include one or more central processing units (CPU), a processor 601, and one or more memories 602. The memory 602 stores computer-readable instructions that are loaded and executed by the processor 601 to implement the method provided in the above embodiments. Certainly, the server may further include components such as a wired or wireless network interface, a keyboard, and an input/output (I/O) interface, for inputting and outputting. The server may further include another component configured to implement a device function. Details are not described herein again.

In an exemplary embodiment, a computer storage medium, for example, a memory including instructions, is further provided. The instructions may be executed by a processor in a terminal to implement the method for electing a representative node device in the above embodiments. For example, the computer storage medium may be a read-only memory (ROM), a random access memory (RAM), a compact disc ROM (CD-ROM), a magnetic tape, a floppy disk, an optical data storage device, or the like.

A person of ordinary skill in the art may understand that all or part of the procedures of the above embodiments may be implemented by a program instructing related hardware. The program may be stored in a computer storage medium. The storage medium mentioned above may be a ROM, a magnetic disk, an optical disk, and so on.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A method of electing a representative node device for a blockchain system including multiple node devices, performed by the blockchain system having a processor and memory storing computer-readable instructions to be executed by the blockchain system, the method comprising:
    in accordance with a first node device in the blockchain system being in a candidate state for becoming one of a set of representative node devices for the blockchain system, receiving, at a target server of the blockchain system, internet protocol (IP) address information of the first node device, wherein representative node devices in the blockchain system are configured to generate blockchain blocks, and wherein nonrepresentative node devices do not participate in block generation;
    receiving, at the target server, an IP address obtaining request from the first node device, the IP address obtaining request being used for requesting IP address information of a representative node device of the blockchain system;
    in accordance with the first node device being elected as one of the set of representative node devices of the blockchain system in a current election process, transmitting an IP address list from the target server to the first node device, the IP address list comprising IP address information for the set of representative node devices elected in the current election process; and
    in accordance with the first node device not being elected as one of the set of representative node devices of the blockchain system elected in the current election process, skipping the IP address obtaining request.

2. The method according to claim 1, further comprising:
    when the current election process ends, transmitting a search request from the target server to one or more devices of the blockchain system, the search request being used for searching for representative node devices elected in the current election process; and
    receiving, at the target server, public keys of the representative node devices.

3. The method according to claim 2, further comprising:
    selecting, according to the public keys of the representative node devices, IP address information of the representative node devices from the received IP address information; and
    generating the IP address list based on the IP address information of the representative node devices.

4. The method according to claim 1, wherein the IP address obtaining request carries a public key of the first node device and the first node device switches from the candidate state to a representative state after receiving the IP address list.

5. The method according to claim 1, wherein the first node device is configured to:
    after being elected as one of the set of representative node devices of the blockchain system in the current election process:
        duplicate IP address information of the first node device into a preset quantity of pieces of the IP address information, the preset quantity being equal to a number of the representative node devices of the blockchain system in the current election process;
        encrypt each of the preset quantity of pieces of the IP address information by using a public key of a respective one of the set of representative node devices elected in the current election process, to obtain a preset quantity of ciphertexts;
        broadcast the preset quantity of ciphertexts; and
        switch from the candidate state to a representative state after a preset duration.

6. The method according to claim 5, wherein the first node device is further configured to:
    encrypt the IP address information of the first node device by using a private key of the first node device before duplicate the IP address information of the first node device.

7. The method according to claim 1, wherein the blockchain system is configured to:
    take a vote on electing at least one node device of the blockchain system as a representative node device of the blockchain system; and
    determining, according to a quantity of votes determined for the at least one node device by the vote, a preset quantity of representative node devices of the blockchain system.

8. A blockchain system including multiple node devices and a target server, the blockchain system comprising a processor, memory, and computer-readable instructions stored in the memory that, when executed by the processor, cause the blockchain system to perform a plurality of operations including:
    in accordance with a first node device in the blockchain system being in a candidate state for becoming one of a set of representative node devices for the blockchain system, receiving, at the target server, internet protocol (IP) address information of the first node device;
    receiving, at the target server, an IP address obtaining request from the first node device, the IP address obtaining request being used for requesting IP address information of a representative node device of the blockchain system, wherein representative node devices in the blockchain system are configured to generate blockchain blocks, and nonrepresentative node devices do not participate in block generation in the blockchain system;
    in accordance with the first node device being elected as one of the set of representative node devices of the blockchain system in a current election process, transmitting an IP address list from the target server to the first node device, the IP address list comprising IP address information for the set of representative node devices elected in the current election process; and in accordance with the first node device not being elected as one of the set of representative node devices of the blockchain system elected in the current election process, skipping the IP address obtaining request.

9. The blockchain system according to claim 8, wherein the plurality of operations further comprise:

when the current election process ends, transmitting a search request from the target server to one or more devices of the blockchain system, the search request being used for searching for representative node devices elected in the current election process; and receiving, at the target server, public keys of the representative node devices.

10. The blockchain system according to claim 9, wherein the plurality of operations further comprise:

selecting, according to the public keys of the representative node devices, IP address information of the representative node devices from the received IP address information; and generating the IP address list based on the IP address information of the representative node devices.

11. The blockchain system according to claim 8, wherein the IP address obtaining request carries a public key of the first node device and the first node device switches from the candidate state to a representative state after receiving the IP address list.

12. The blockchain system according to claim 8, wherein the first node device is configured to:

after being elected as one of the set of representative node devices of the blockchain system in the current election process:

duplicate IP address information of the first node device into a preset quantity of pieces of the IP address information, the preset quantity being equal to a number of the representative node devices of the blockchain system in the current election process;

encrypt each of the preset quantity of pieces of the IP address information by using a public key of a respective one of the set of representative node devices elected in the current election process, to obtain a preset quantity of ciphertexts;

broadcast the preset quantity of ciphertexts; and switch from the candidate state to a representative state after a preset duration.

13. The blockchain system according to claim 12, wherein the first node device is further configured to:

encrypt the IP address information of the first node device by using a private key of the first node device before duplicate the IP address information of the first node device.

14. The blockchain system according to claim 8, wherein the blockchain system is configured to:

take a vote on electing at least one node device of the blockchain system as a representative node device of the blockchain system; and determining, according to a quantity of votes determined for the at least one node device by the vote, a preset quantity of representative node devices of the blockchain system.

15. A non-transitory computer-readable storage medium, storing computer-readable instructions that, when executed by a processor of a blockchain system including multiple node devices and a target server, causing the blockchain system to perform a plurality of operations including:

in accordance with a first node device in the blockchain system being in a candidate state for becoming one of a set of representative node devices for the blockchain system, receiving, at the target server, internet protocol (IP) address information of the first node device;

receiving, at the target server, an IP address obtaining request from the first node device, the IP address obtaining request being used for requesting IP address information of a representative node device of the blockchain system, wherein representative node devices in the blockchain system are configured to generate blockchain blocks, and nonrepresentative node devices do not participate in block generation in the blockchain system;

in accordance with the first node device being elected as one of the set of representative node devices of the blockchain system in a current election process, transmitting an IP address list from the target server to the first node device, the IP address list comprising IP address information for the set of representative node devices elected in the current election process; and in accordance with the first node device not being elected as one of the set of representative node devices of the blockchain system elected in the current election process, skipping the IP address obtaining request.

16. The non-transitory computer-readable storage medium according to claim 15, wherein the plurality of operations further comprise:

when the current election process ends, transmitting a search request from the target server to one or more devices of the blockchain system, the search request being used for searching for representative node devices elected in the current election process; and receiving, at the target server, public keys of the representative node devices.

17. The non-transitory computer-readable storage medium according to claim 16, wherein the plurality of operations further comprise:

selecting, according to the public keys of the representative node devices, IP address information of the representative node devices from the received IP address information; and generating the IP address list based on the IP address information of the representative node devices.

18. The non-transitory computer-readable storage medium according to claim 15, wherein the IP address obtaining request carries a public key of the first node device and the first node device switches from the candidate state to a representative state after receiving the IP address list.

19. The non-transitory computer-readable storage medium according to claim 15, wherein the first node device is configured to:

after being elected as one of the set of representative node devices of the blockchain system in the current election process:

duplicate IP address information of the first node device into a preset quantity of pieces of the IP address information, the preset quantity being equal to a number of the representative node devices of the blockchain system in the current election process;

encrypt each of the preset quantity of pieces of the IP address information by using a public key of a respective one of the set of representative node devices elected in the current election process, to obtain a preset quantity of ciphertexts;

broadcast the preset quantity of ciphertexts; and
switch from the candidate state to a representative state after a preset duration.

20. The non-transitory computer-readable storage medium according to claim 19, wherein the first node device is further configured to:
encrypt the IP address information of the first node device by using a private key of the first node device before duplicate the IP address information of the first node device.

* * * * *